(12) United States Patent
Burra

(10) Patent No.: US 10,879,943 B2
(45) Date of Patent: Dec. 29, 2020

(54) WIRELESS DEVICE WITH MIPI BUS

(71) Applicant: Qorvo US, Inc., Greensboro, NC (US)

(72) Inventor: Gangadhar Burra, Fremont, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/565,566

(22) Filed: Sep. 10, 2019

(65) Prior Publication Data

US 2020/0195280 A1 Jun. 18, 2020

Related U.S. Application Data

(60) Provisional application No. 62/781,449, filed on Dec. 18, 2018.

(51) Int. Cl.
*H04B 1/00* (2006.01)

(52) U.S. Cl.
CPC ............ *H04B 1/006* (2013.01); *H04B 1/0028* (2013.01); *H04B 1/0057* (2013.01)

(58) Field of Classification Search
CPC ............................. H04B 1/005; H04B 1/0057
See application file for complete search history.

(56) References Cited

U.S. PATENT DOCUMENTS

2015/0056941 A1* 2/2015 Lin .................... H04B 1/18
 455/352
2018/0159483 A1* 6/2018 Masood ............ H03F 1/0261

\* cited by examiner

*Primary Examiner* — Keith Ferguson
(74) *Attorney, Agent, or Firm* — Withrow & Terranova, P.L.L.C.

(57) ABSTRACT

The present disclosure relates to a wireless device including a mobile industry processor interface (MIPI) bus, a baseband processing module, and a radio frequency (RF) front-end module. Herein, digital data signals are transmitted bi-directionally between the baseband processing module and the digital front-end module, and RF signals are transmitted bi-directionally between the digital front-end module and an antenna. Each digital data signal is related to a corresponding RF signal. The baseband processing module and the digital front-end module are coupled to the MIPI bus, which is configured to transmit digital control signals between the baseband processing module and the digital front-end module. There is no analog signal transmitted between the baseband processing module and the digital front-end module.

20 Claims, 3 Drawing Sheets

WIRELESS DEVICE WITH MIPI BUS

RELATED APPLICATIONS

This application claims the benefit of provisional patent application Ser. No. 62/781,449, filed Dec. 18, 2018, the disclosure of which is hereby incorporated herein by reference in its entirety.

FIELD OF THE DISCLOSURE

This disclosure relates generally to a wireless device with a mobile industry processor interface (MIPI) bus for RF communications.

BACKGROUND

Wireless communication is a type of data communication that provides various telecommunication services such as telephony, video, messaging, and broadcasts. For each wireless device to participate in wireless communications, it includes one or more radio-frequency (RF) front-ends, which amplify RF signals before transmission or after reception, and a chipset, which performs conversion between the RF signals and baseband signals and performs baseband signal processing.

FIG. 1 shows a conventional wireless device 10 with a chipset 12, a first front-end 14, a second front-end 16, and a third front-end 18. The first front-end 14 is coupled between the chipset 12 and a first antenna $ANT_1$, the second front-end 16 is coupled between the chipset 12 and a second antenna $ANT_2$, and the third front-end 18 is coupled between the chipset 12 and a third antenna $ANT_3$. The first, second, and third front-ends 14, 16, and 18 help to amplify RF signals before transmission or after reception (to or from its corresponding antenna, respectively). Herein, signals transmitted between each front-end 14/16/18 and the chipset 12 include RF signals $RF_{in}/RF_{out}$ and digital control signals CS, which are configured to control the RF signal transmission directions, power ON/OFF the corresponding front-end, amplification gain, and/or etc. As the number of different bands and concurrency of operation increases, the complexity of routing a large number of RF and control signals becomes untenable. Consequently, the number of front-ends within the wireless device 10 will be limited, and the wireless device 10 may only accommodate limited frequency ranges.

To increase the scalability and flexibility in terms of overall front-end configurations without suffering complicated layout, it is therefore an object of the present disclosure to provide an improved wireless device design to accommodate more front-end blocks at one time and/or to accommodate different frequency ranges of the front-end blocks.

SUMMARY

The present disclosure relates to a wireless device with a mobile industry processor interface (MIPI) bus for radio frequency (RF) communications. The disclosed wireless device also includes a baseband processing module and a digital front-end module. Herein, digital data signals are transmitted bi-directionally between the baseband processing module and the digital front-end module, and RF signals are transmitted bi-directionally between the digital front-end module and an antenna. The baseband processing module and the digital front-end module are coupled to the MIPI bus, which is configured to transmit digital control signals between the baseband processing module and the digital front-end module. There is no analog signal transmitted between the baseband processing module and the digital front-end module.

In one embodiment of the wireless device, the baseband processing module and the digital front-end module are integrated in separate chips.

In one embodiment of the wireless device, the MIPI bus, the baseband processing module, and the digital front-end module are assembled in one printed circuit board.

In one embodiment of the wireless device, the digital front-end module includes a first front-end block coupled to the antenna and at least one transceiver coupled between the first front-end block and the baseband processing module. Herein, the first front-end block is configured to amplify a first inbound RF signal from the antenna and provide a first inbound amplified RF signal, and the at least one transceiver is configured to down convert the first inbound amplified RF signal and provide an inbound digital data signal to the baseband processing module; or the at least one transceiver is configured to up convert an outbound digital data signal from the baseband processing module and provide a first outbound RF signal, and the first front-end block is configured to amplify the first outbound RF signal and provide a first outbound amplified RF signal to the antenna. The inbound digital data signal and the outbound digital data signal are the digital data signals transmitted bi-directionally between the baseband processing module and the digital front-end module. The first inbound RF signal and the first outbound amplified RF signal are the RF signals transmitted bi-directionally between the digital front-end module and the antenna.

In one embodiment of the wireless device, the first front-end block and the at least one transceiver are coupled to the MIPI bus. Herein, the MIPI bus is configured to transmit transceiver control signals between the baseband processing module and the at least one transceiver, and configured to transmit front-end control signals between the baseband processing module and the first front-end block, wherein the transceiver control signals and the front-end control signals are the digital control signals transmitted within the MIPI bus.

In one embodiment of the wireless device, the MIPI bus is configured to transmit internal control signals between the first front-end block and the at least one transceiver, wherein the internal control signals are the digital control signals.

In one embodiment of the wireless device, the first front-end block includes a processing function unit, which enables the first front-end block to receive and process the front-end control signals from the baseband processing module through the MIPI bus.

In one embodiment of the wireless device, the front-end control signals include at least one of modulation and coding scheme (MCS) information, band and channel information, digital pre-distortion (DPD) information, and potential envelop tracking (ET) information etc.

In one embodiment of the wireless device, the transceiver control signals include at least one of MCS information, band and channel information, DPD information, and potential ET information etc.

In one embodiment of the wireless device, the digital front-end module further includes a tunable bandpass filter between the first front-end block and the antenna.

In one embodiment of the wireless device, the first front-end block includes a first power amplifier and a first low-noise amplifier, and the at least one transceiver includes a transmitter and a receiver. When signal transmission is from the baseband processing module to the antenna, the transmitter within the at least one transceiver and the first power amplifier within the first front-end block are turned ON. Herein, the transmitter is configured to up convert the outbound digital data signal from the baseband processing module and provide the first outbound RF signal, and the first power amplifier is configured to amplify the first outbound RF signal and provide the first outbound amplified RF signal to the antenna. When signal transmission is from the antenna to the baseband processing module, the receiver within the at least one transceiver and the first low-noise amplifier within the first front-end block are turned ON. Herein, the first low-noise amplifier is configured to amplify the first inbound RF signal from the antenna and provide the first inbound amplified RF signal, and the receiver is configured to down convert the first inbound amplified RF signal and provide the inbound digital data signal to the baseband processing module.

In one embodiment of the wireless device, the digital front-end module includes a first tunable bandpass filter coupled between the first power amplifier and the transmitter, and a second tunable bandpass filter coupled between the first low-noise amplifier and the receiver. In addition, the digital front-end module further includes a third tunable bandpass filter between the first front-end block and the antenna.

In one embodiment of the wireless device, the digital front-end module further includes a second front-end block and a diplexer. The first front-end block and the second front-end block are coupled to the antenna through the diplexer, and the at least one transceiver is coupled between the second front-end block and the baseband processing module. Herein, the second front-end block is configured to amplify a second inbound RF signal from the antenna and provide a second inbound amplified RF signal, and the at least one transceiver is configured to down convert a combination of the first inbound amplified RF signal and the second inbound amplified RF signal and provide the inbound digital data signal to the baseband processing module; or the at least one transceiver is configured to up convert the outbound digital data signal and provide a combination of the first outbound RF signal and a second outbound RF signal, and the second front-end block is configured to amplify the second outbound RF signal and provide a second outbound amplified RF signal to the antenna. The second inbound RF signal and the second outbound amplified RF signal are the RF signals transmitted bi-directionally between the digital front-end module and the antenna.

In one embodiment of the wireless device, the first front-end block, the second front-end block, and the at least one transceiver are coupled to the MIPI bus. Herein, the MIPI bus is configured to transmit transceiver control signals between the baseband processing module and the at least one transceiver, transmit first front-end control signals between the baseband processing module and the first front-end block, and transmit second front-end control signals between the baseband processing module and the second front-end block. The transceiver control signals, the first front-end control signals, and the second front-end control signals are the digital control signals transmitted within the MIPI bus.

In one embodiment of the wireless device, the digital front-end module further includes a first tunable bandpass filter between the first front-end block and the diplexer, and a second tunable bandpass filter between the second front-end block and the diplexer.

In one embodiment of the wireless device, the first tunable bandpass filter and the second tunable bandpass filter do not have joint bandwidths simultaneously.

In one embodiment of the wireless device, the digital front-end module further includes a second front-end block and a diplexer, and the least one transceiver includes a first transceiver and a second transceiver. The first front-end block and the second front-end block are coupled to the antenna through the diplexer. The first transceiver is coupled between the baseband processing module and the first front-end block, while the second transceiver is coupled between the baseband processing module and the second front-end block. Herein, the first transceiver is configured to down convert the first inbound amplified RF signal and provide the inbound digital data signal to the baseband processing module, or the first transceiver is configured to up convert the outbound digital data signal and provide the first outbound RF signal. The second front-end block is configured to amplify a second inbound RF signal from the antenna and provide a second inbound amplified RF signal, and the second transceiver is configured to down convert the second inbound amplified RF signal and provide a second inbound digital data signal to the baseband processing module; or the second transceiver is configured to up convert a second outbound digital data signal and provide a second outbound RF signal, and the second front-end block is configured to amplify the second outbound RF signal and provide a second outbound amplified RF signal to the antenna. The second inbound digital data signal and the second outbound digital data signal are the digital data signals transmitted bi-directionally between the baseband processing module and the digital front-end module, and the second inbound RF signal and the second outbound amplified RF signal are the RF signals transmitted bi-directionally between the digital front-end module and the antenna.

In one embodiment of the wireless device, the first front-end block, the second front-end block, the first transceiver, and the second transceiver are coupled to the MIPI bus. Herein, the MIPI bus is configured to transmit first transceiver control signals between the baseband processing module and the first transceiver, transmit second transceiver control signals between the baseband processing module and the second transceiver, transmit first front-end control signals between the baseband processing module and the first front-end block, and transmit second front-end control signals between the baseband processing module and the second front-end block. The first transceiver control signals, the second transceiver control signals, the first front-end control signals, and the second front-end control signals are the digital control signals transmitted within the MIPI bus.

In one embodiment of the wireless device, the digital front-end module further includes a first tunable bandpass filter between the first front-end block and the diplexer, and a second tunable bandpass filter between the second front-end block and the diplexer.

In one embodiment of the wireless device, the first tunable bandpass filter and the second tunable bandpass filter do not have joint bandwidths simultaneously.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
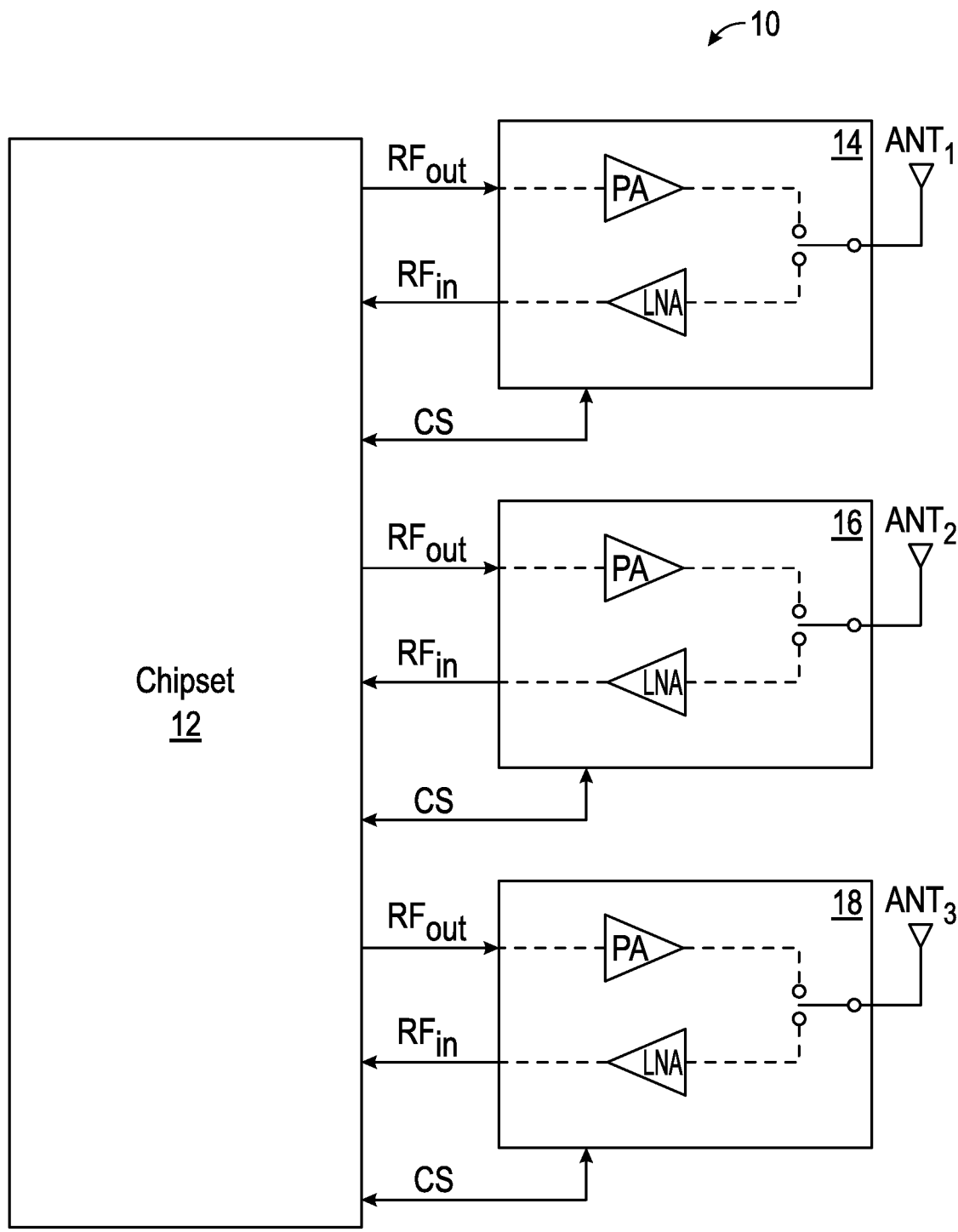
FIG. 1 shows a conventional wireless device.
Figure 2:
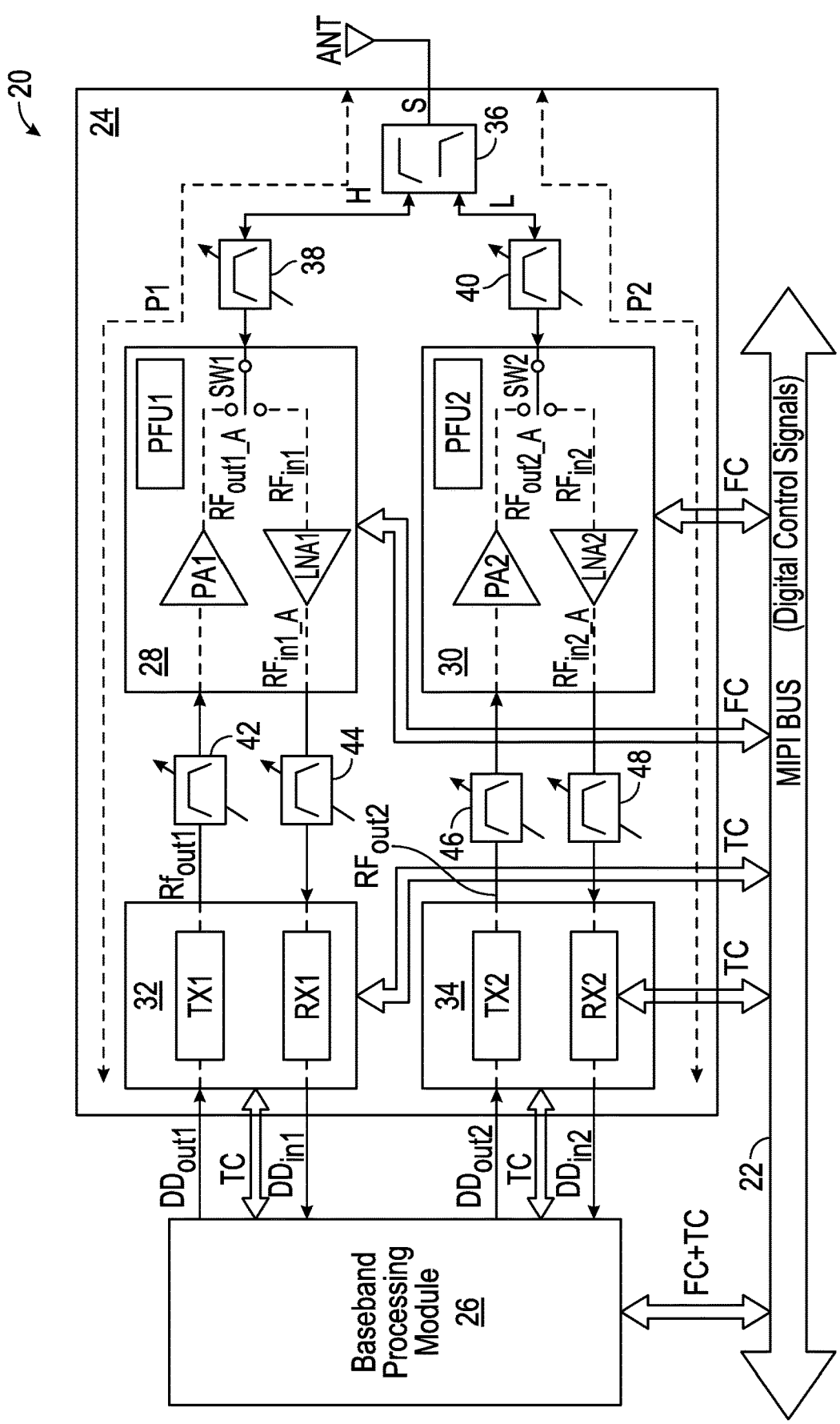
FIG. 2 shows an exemplary wireless device with a mobile industry processor interface (MIPI) bus according to one embodiment of the present disclosure.
Figure 3:
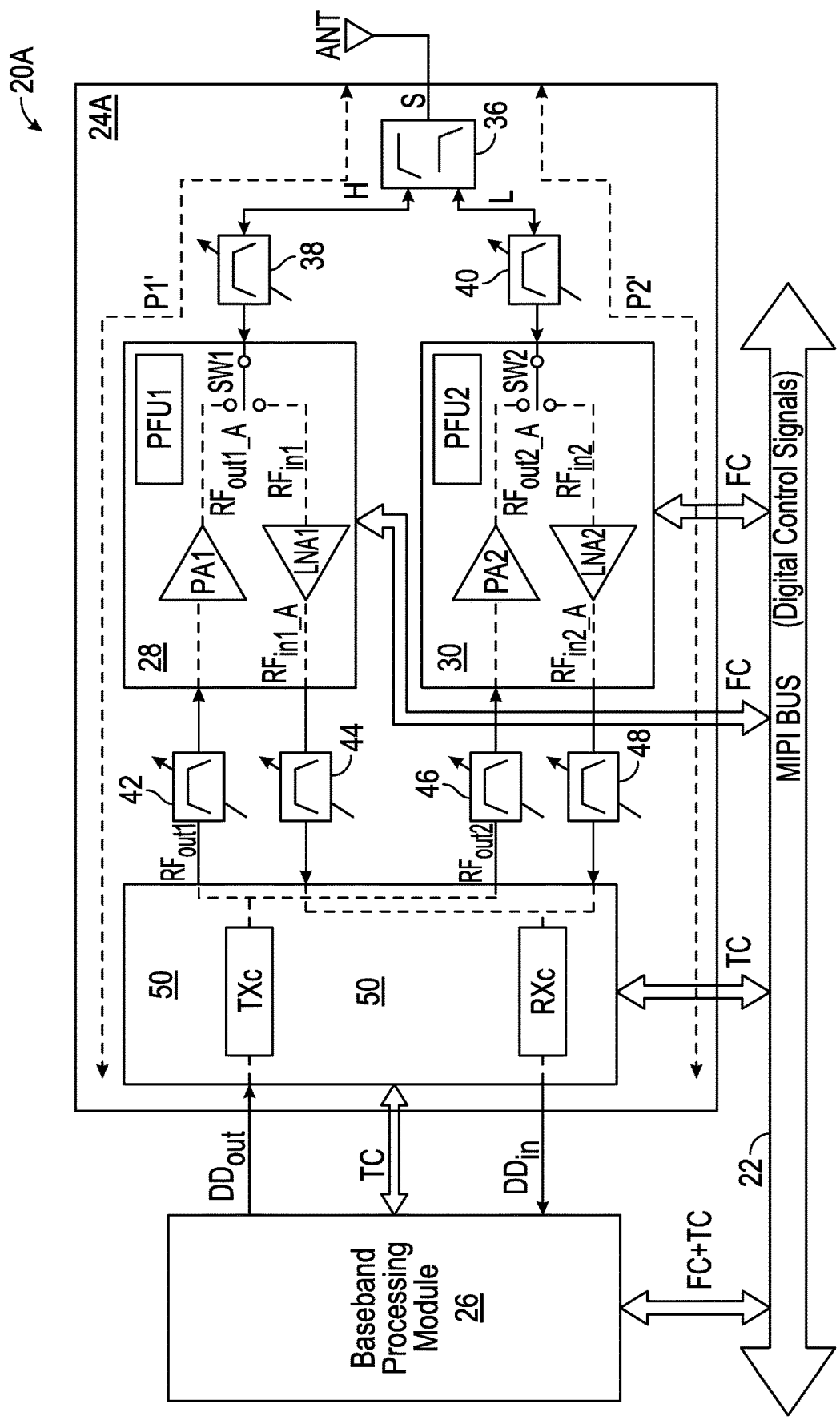
FIG. 3 shows an alternative wireless device with a MIPI bus according to one embodiment of the present disclosure.

It will be understood that for clear illustrations, FIGS. 1-3 may not be drawn to scale.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 2 illustrates an exemplary wireless device 20 according to one embodiment of the present disclosure. The wireless device 20 includes a mobile industry processor interface (MIPI) bus 22, a digital front-end module 24, and a baseband processing module 26. Herein, digital data signals are transmitted bi-directionally between the digital front-end module 24 and the baseband processing module 26, and radio frequency (RF) signals are transmitted bi-directionally between the digital front-end module 24 and an antenna ANT. Each digital data signal is related to a corresponding RF signal. Note that there is no analog signal transmitted between the digital front-end module 24 and the baseband processing module 26. The digital front-end module 24 and the baseband processing module 26 may be integrated in separate chips. In addition, both the digital front-end module 24 and the baseband processing module 26 are coupled to the MIPI bus 22, which is configured to transmit digital control signals bi-directionally between the digital front-end module 24 and the baseband processing module 26. The MIPI bus 22, the digital front-end module 24, and the baseband processing module 26 may be assembled in one printed circuit board.

The baseband processing module 26 may include a baseband modem (not shown). The digital front-end module 24, for the purpose of this illustration, includes a first front-end block 28, a second front-end block 30, a first transceiver 32, a second transceiver 34, and a diplexer 36. In different applications, the digital front-end module 24 may include fewer or more front-end blocks and/or include fewer or more transceivers. If there are only one front-end block and one transceiver, the diplexer 36 is omitted. If there are more front-end blocks and transceivers, a multiplexer, instead of the diplexer 36, is presented.

The diplexer 36 has three ports S, H, and L. The port S of the diplexer 36 is coupled to the antenna ANT, the port H is coupled to the first front-end block 28, and the port L is coupled to the second front-end block 30. The first transceiver 32 is coupled between the first front-end block 28 and the baseband processing module 26, and the second transceiver 34 is coupled between the second front-end block 30 and the baseband processing module 26. Herein, the digital data signals are transmitted bi-directionally between each transceiver 32/34 and the baseband processing module 26, and the RF signals are transmitted bi-directionally between each front-end block 28/30 (through the diplexer 36) and the antenna ANT. Typically, the first front-end block 28 and the second front-end block 30 may operate at disjointed frequency bands, e.g. the first front-end block 28 may operate at around 5 GHz, while the second front-end block 30 may operate at around 2.4 GHz. As such, the RF signals at the port H of the diplexer 36 and the RF signals at the port L of the diplexer 36 may be multiplexed and coexist on port S of the diplexer 36 without interfering with each other.

The first transceiver 32 and the first front-end block 28 (through the diplexer 36) form a first transmission path P1 between the baseband processing module 26 and the antenna ANT, while the second transceiver 34 and the second front-end block 30 (through the diplexer 36) form a second transmission path P2 between the baseband processing module 26 and the antenna ANT. In detail, the first front-end block 28 includes a first power amplifier PA1, a first low-noise amplifier LNA1, and a first switch SW1, while the second front-end block 30 includes a second power amplifier PA2, a second low-noise amplifier LNA2, and a second switch SW2. The first transceiver 32 includes a first transmitter TX1 and a first receiver RX1, while the second transceiver 34 includes a second transmitter TX2 and a second receiver RX2. For clarity and simplification, other components in the first front-end block 28, the second front-end block 30, the first transceiver 32, and the second transceiver 34 are not shown here.

When the signal transmission is from the antenna ANT to the baseband processing module 26, for the first transmission path P1, the first switch SW1 within the first front-end block 28 may be coupled to the first low-noise amplifier LNA1 (the first low-noise amplifier LNA1 is turned ON). The first front-end block 28 is configured to amplify a first inbound RF signal $RF_{in1}$ (from the antenna ANT through the diplexer 36) and provide a first inbound amplified RF signal $RF_{in1\_A}$. The first receiver RX1 of the first transceiver 32 is turned ON, and the first transceiver 32 is configured to down convert the first inbound amplified RF signal $RF_{in1\_A}$ and provide a first inbound digital data signal $DD_{in1}$ to the baseband processing module 26. Herein, down converting refers to at least frequency decreasing and analog to digital conversion. In addition, for the second transmission path P2, the second switch SW2 within the second front-end block 30 may be coupled to the second low-noise amplifier LNA2 (the second low-noise amplifier LNA2 is turned ON), and the second front-end block 30 is configured to amplify a second inbound RF signal $RF_{in2}$ (from the antenna ANT through the diplexer 36) and provide a second inbound amplified RF signal $RF_{in2\_A}$. The second receiver RX2 of the second transceiver 34 is turned ON, and the second transceiver 34 is configured to down convert the second inbound amplified RF signal $RF_{in2\_A}$ and provide a second inbound digital data signal $DD_{in2}$ to the baseband processing module 26. The first transmission path P1 and the second transmission path P2 may be conductive at a same time or in different time slots.

When the signal transmission is from the baseband processing module 26 to the antenna ANT, for the first transmission path P1, the first transmitter TX1 of the first transceiver 32 is turned ON. The first transceiver 32 is configured to up convert a first outbound digital data signal $DD_{out1}$ (from the baseband processing module 26) and provide a first outbound RF signal $RF_{out1}$. Herein, up converting refers to at least digital to analog conversion and frequency increasing. The first switch SW1 within the first front-end block 28 may be coupled to the first power amplifier PA1 (the first power amplifier PA1 is turned ON), and the first front-end block 28 is configured to amplify the first outbound RF signal $RF_{out1}$ and provide a first outbound amplified RF signal $RF_{out1\_A}$ to the antenna ANT through the diplexer 36. In addition, for the second transmission path P2, the second transmitter TX2 of the second transceiver 34 is turned ON. The second transceiver 34 is configured to up convert a second outbound digital data signal $DD_{out2}$ (the baseband processing module 26) and provide a second outbound RF signal $RF_{out2}$. The second switch SW2 within the second front-end block 30 may be coupled to the second power amplifier PA2 (the second power amplifier PA2 is turned ON), and the second front-end block 30 is configured to amplify the second outbound RF signal $RF_{out2}$ and provide a second outbound amplified RF signal $RF_{out2\_A}$ to the antenna ANT through the diplexer 36.

Herein, the first inbound digital data signal $DD_{in1}$, the second inbound digital data signal $DD_{in2}$, the first outbound digital data signal $DD_{out1}$, and the second outbound digital data signal $DD_{out2}$ are the digital data signals transmitted bi-directionally between the baseband processing module 26 and the digital front-end module 24. The first inbound RF signal $RF_{in1}$, the second inbound RF signal $RF_{in2}$, the first outbound amplified RF signal $RF_{out1\_A}$, and the second outbound amplified RF signal $RF_{out2\_A}$ are the RF signals transmitted bi-directionally between the digital front-end module 24 and the antenna.

The MIPI bus 22 may be coupled to each of the first front-end block 28, the second front-end block 30, the first transceiver 32, and the second transceiver 34 within the digital front-end module 24. In some applications, the first and second front-end blocks 28 and 30 may further include a first processing function unit PFU1 and a second processing function unit PFU2, respectively. The first and second processing function units PFU1 and PFU2 enable the first and second front-end blocks 28 and 30 to receive and process various front-end control signals FC from the baseband processing module 26 through the MIPI bus 22, respectively. For instance, the front-end control signals FC (between the baseband processing module 26 and each front-end block 28/30) may include modulation and coding scheme (MCS) information. The first and second processing function units PFU1 and PFU2 may be configured to store and process the MCS information and other pertinent information to control the first and second front-end blocks 28 and 30. The front-end control signals FC between the baseband processing module 26 and each front-end block 28/30 may also include band and channel information, digital pre-distortion (DPD) information, potential envelop tracking (ET) information, and/or etc.

In addition, the MIPI bus 22 is configured to transmit transceiver control signals TC, such as MCS information, band and channel information, DPD information, potential ET information, and/or etc, between the baseband processing module 26 and the first/second transceiver 32/34. The transceiver control signals TC is used to control the first and second transceivers 32 and 34. Both the front-end control signals FC and the transceiver control signals TC are the digital control signals transmitted within the MIPI bus 22. In one embodiment, the baseband processing module 26 may be requested to quickly control one or more features of the first/second transceiver 32/34, and the MIPI bus 22 may not satisfy the time requirement. Some of the transceiver control signals TC may be transmitted directly from the baseband processing module 26 to the first/second transceiver 32/34 (sidecar control lines). Notice that the control signals and the data signals transmitted between the baseband processing module 26 and the digital front-end module 24, either through the MIPI bus 22 or directly, are all digital signals. There is no analog signal transmitted between the baseband processing module 26 and the digital front-end module 24. Further, the MIPI bus 22 may be configured to transmit internal control signals (not shown), which are also digital control signals, between the first transceiver 32 and the first front-end block 28, and between the second transceiver 34 and the second front-end block 30.

To get rid of undesired signals in the first and second transmission paths P1 and P2, the digital front-end module 24 may further include tunable bandpass filters. In one embodiment, the digital front-end module 24 may include a first tunable bandpass filter 38 coupled between the port H of the diplexer 36 and the first front-end block 28, and a second tunable bandpass filter 40 coupled between the port L of the diplexer 36 and the second front-end block 30. The bandwidth of the first tunable bandpass filter 38 may be controlled by the first front-end block 28 directly, or controlled by the first front-end block 28 through the MIPI bus 22, or controlled by the baseband processing module 26 through the MIPI bus 22 (not shown). Similarly, the second tunable bandpass filter 40 may be controlled by the second front-end block 30 directly, or controlled by the second front-end block 30 through the MIPI bus 22, or controlled by the baseband processing module 26 through the MIPI bus 22 (not shown). The first tunable bandpass filter 38 and the second tunable bandpass filter 40 will not have joint or overlapped bandwidths simultaneously. Therefore, signals on the first transmission path P1 and on the second transmission path P2 may coexist on port S of the diplexer 36.

Because of the tunable bandwidth of the first tunable bandpass filter 38, the first front-end block 28 is able to operate at different frequency ranges dynamically for both input and output RF signals (e.g. operating at 5.1 GHz-5.4 GHz first, then operating at 5.6 GHz-5.9 GHz). Similarly, because of the tunable bandwidth of the second tunable bandpass filter 40, the second front-end block 30 is able to operate at different frequency ranges dynamically for both input and output RF signals (e.g. operating at 2.4 GHz-2.6 GHz first, then operating at 2.7 GHz-2.9 GHz). Consequently, the wireless device 10 has flexibility in operating frequency range.

In addition, the digital front-end module 24 may further include a third tunable bandpass filter 42 coupled between the first transmitter TX1 of the first transceiver 32 and the first power amplifier PA1 of the first front-end block 28, a fourth tunable bandpass filter 44 coupled between the first receiver RX1 of the first transceiver 32 and the first low-noise amplifier LNA1 of the first front-end block 28, a fifth tunable bandpass filter 46 coupled between the second transmitter TX2 of the second transceiver 34 and the second power amplifier PA2 of the second front-end block 30, and a sixth tunable bandpass filter 48 coupled between the second receiver RX2 of the second transceiver 34 and the second low-noise amplifier LNA2 of the second front-end block 30.

The bandwidths of the third tunable bandpass filter 42 and the fourth tunable bandpass filter 44 may be controlled by the first front-end block 28 directly, or controlled by the first front-end block 28 through the MIPI bus 22, or controlled by the first transceiver 32 directly, or controlled by the first transceiver 32 through the MIPI bus 22, or controlled by the baseband processing module 26 through the MIPI bus 22 (not shown). Further, the bandwidths of the third tunable bandpass filter 42 and the fourth tunable bandpass filter 44 may be matched to the bandwidth of the first tunable bandpass filter 38 simultaneously.

Similarly, the bandwidths of the fifth tunable bandpass filter 46 and the sixth tunable bandpass filter 48 may be may be controlled by the second front-end block 30 directly, or controlled by the second front-end block 30 through the MIPI bus 22, or controlled by the second transceiver 34 directly, or controlled by the second transceiver 34 through the MIPI bus 22, or controlled by the baseband processing module 26 through the MIPI bus 22 (not shown). Further, the bandwidths of the fifth tunable bandpass filter 46 and the sixth tunable bandpass filter 48 may be matched to the bandwidth of the second tunable bandpass filter 40 simultaneously. In some applications, the first and second tunable bandpass filters 38 and 40 may be omitted, and the digital front-end module 24 includes the third, fourth, fifth and sixth tunable bandpass filters 42, 44, 46, and 48. The first and second front-end blocks 28 and 30 are still able to operate at different frequency ranges dynamically.

FIG. 3 shows an alternative wireless device 20A according to one embodiment of the present disclosure. Instead of the first and second transceivers 32 and 34, the alternative wireless device 20A includes a common transceiver 50 within an alternative front-end module 24A. The common transceiver 50 is coupled between the first front-end block 28 and the baseband processing module 26, and also between the second front-end block 30 and the baseband processing module 26. The common transceiver 50 includes a common transmitter TXc and a common receiver RXc.

Herein, the common transceiver 50 and the first front-end block 28 (through the diplexer 36) form a first transmission path P1' between the baseband processing module 26 and the antenna ANT, while the common transceiver 50 and the second front-end block 30 (through the diplexer 36) form a second transmission path P2' between the baseband processing module 26 and the antenna ANT. When the signal transmission is from the antenna ANT to the baseband processing module 26, if both the first and second transmission paths P1 and P2 are conductive, the first inbound amplified RF signal $RF_{in1\_A}$ and the second inbound amplified RF signal $RF_{in2\_A}$ may be filtered separately (through the fourth and sixth tunable bandpass filters 44 and 48, respectively) and then combined and provided to the common receiver RXc. Based on this combined RF signal, the common receiver RXc is configured to provide an inbound digital data signal $DD_{in}$ to the baseband processing module 26. If only the first or the second transmission path P1 or P2 is conductive, either the first inbound amplified RF signal $RF_{in1\_A}$ or the second inbound amplified RF signal $RF_{in2\_A}$ may be filtered, and then provided to the common receiver RXc.

When the signal transmission is from the baseband processing module 26 to the antenna ANT, the common transmitter TXc is turned ON and configured to provide an outbound RF signal $RF_{out}$ based on an outbound digital data signal $DD_{out}$ from the baseband processing module 26. If both the first and second transmission paths P1 and P2 are conductive, the outbound RF signal $RF_{out}$ is filtered by two different filters in parallel (the third and fifth tunable bandpass filters 42 and 46 with disjointed bandwidths), and then a first outbound RF signal $RF_{out1}$ and a second outbound RF signal $RF_{out2}$, which are different from each other, are provided to the first front-end block 28 and the second front-end block 30, respectively. If only the first or the second transmission path P1 or P2 is conductive, the outbound RF signal $RF_{out}$ is filtered by one filter (either the third or the fifth tunable bandpass filter 42 or 46), and then provided to the first front-end block 28 or the second front-end block 30.

The common transceiver 50 is coupled to the MIPI bus 22, and the MIPI bus 22 is configured to transmit transceiver control signals TC, such as MCS information, band and channel information, DPD information, potential ET information, and/or etc, between the baseband processing module 26 and the common transceiver 50. Herein, the transceiver control signals TC is used to control the common transceiver 50. In one embodiment, the baseband processing module 26 may be requested to quickly control one or more features of the common transceiver 50, and the MIPI bus 22 may not satisfy the time requirement. Some of the transceiver control signals may be transmitted directly from the baseband processing module 26 to the common transceiver 50 (sidecar control line). Notice that the control signals and the data signals transmitted between the baseband processing module 26 and the common transceiver 50 of the alternative digital front-end module 24A, either through the MIPI bus 22 or directly, are all digital signals. There is no analog signal transmitted between the baseband processing module 26 and the alternative digital front-end module 24A. Further, the MIPI bus 22 may be configured to transmit internal control signals, which are also digital control signals, between the common transceiver 50 and the first front-end block 28, and between the common transceiver 50 and the second front-end block 30.

Those skilled in the art will recognize improvements and modifications to the preferred embodiments of the present disclosure. All such improvements and modifications are considered within the scope of the concepts disclosed herein and the claims that follow.

What is claimed is:

1. An apparatus comprising:
   a mobile industry processor interface (MIPI) bus;
   a baseband processing module;
   a digital front-end module, wherein:
      the baseband processing module and the digital front-end module are coupled to the MIPI bus, which is configured to transmit digital control signals between the baseband processing module and the digital front-end module;
      the digital front-end module comprises a first front-end block coupled to an antenna and at least one transceiver coupled between the first front-end block and the baseband processing module, wherein:
         the first front-end block is configured to amplify a first inbound radio frequency (RF) signal from the antenna and provide a first inbound amplified RF signal, and the at least one transceiver is configured to down convert the first inbound amplified RF signal and provide an inbound digital data signal to the baseband processing module; or
         the at least one transceiver is configured to up convert an outbound digital data signal from the baseband processing module and provide a first outbound RF signal, and the first front-end block is configured to amplify the first outbound RF signal and provide a first outbound amplified RF signal to the antenna;
      no analog signal is transmitted between the baseband processing module and the digital front-end module, the inbound digital data signal and the outbound digital data signal are digital data signals transmitted bi-directionally between the baseband processing module and the digital front-end module, and the first inbound RF signal and the first outbound amplified RF signal are RF signals transmitted bi-directionally between the digital front-end module and the antenna, wherein each digital data signal is related to a corresponding RF signal.

2. The apparatus of claim 1 wherein the baseband processing module and the digital front-end module are integrated in separate chips.

3. The apparatus of claim 1 wherein the MIPI bus, the baseband processing module, and the digital front-end module are assembled in one printed circuit board.

4. The apparatus of claim 1 wherein the first front-end block and the at least one transceiver are coupled to the MIPI bus, wherein the MIPI bus is configured to transmit transceiver control signals between the baseband processing module and the at least one transceiver, and configured to transmit front-end control signals between the baseband processing module and the first front-end block, wherein the transceiver control signals and the front-end control signals are the digital control signals transmitted within the MIPI bus.

5. The apparatus of claim 4 wherein the MIPI bus is configured to transmit internal control signals between the first front-end block and the at least one transceiver, wherein the internal control signals are the digital control signals.

6. The apparatus of claim 4 wherein the first front-end block includes a processing function unit, which enables the first front-end block to receive and process the front-end control signals from the baseband processing module through the MIPI bus.

7. The apparatus of claim 6 wherein the front-end control signals include at least one of modulation and coding scheme (MCS) information, band and channel information, digital pre-distortion (DPD) information, and potential envelop tracking (ET) information.

8. The apparatus of claim 4 wherein the transceiver control signals include at least one of MCS information, band and channel information, DPD information, and potential ET information.

9. The apparatus of claim 4 wherein the digital front-end module further includes a tunable bandpass filter between the first front-end block and the antenna.

10. The apparatus of claim 4 wherein the first front-end block includes a first power amplifier and a first low-noise amplifier, and the at least one transceiver includes a transmitter and a receiver, wherein:
    when signal transmission is from the baseband processing module to the antenna, the transmitter within the at least one transceiver and the first power amplifier within the first front-end block are turned ON, wherein the transmitter is configured to up convert the outbound digital data signal from the baseband processing module and provide the first outbound RF signal, and the first power amplifier is configured to amplify the first outbound RF signal and provide the first outbound amplified RF signal to the antenna;
    when signal transmission is from the antenna to the baseband processing module, the receiver within the at least one transceiver and the first low-noise amplifier within the first front-end block are turned ON, wherein the first low-noise amplifier is configured to amplify the first inbound RF signal from the antenna and provide the first inbound amplified RF signal, and the receiver is configured to down convert the first inbound amplified RF signal and provide the inbound digital data signal to the baseband processing module.

11. The apparatus of claim 10 wherein the digital front-end module further includes a first tunable bandpass filter coupled between the first power amplifier and the transmitter, and a second tunable bandpass filter coupled between the first low-noise amplifier and the receiver.

12. The apparatus of claim 11 wherein the digital front-end module further includes a third tunable bandpass filter between the first front-end block and the antenna.

13. The apparatus of claim 1 wherein the digital front-end module further includes a second front-end block and a diplexer, wherein:
the first front-end block and the second front-end block are coupled to the antenna through the diplexer;
the at least one transceiver is coupled between the second front-end block and the baseband processing module;
the second front-end block is configured to amplify a second inbound RF signal from the antenna and provide a second inbound amplified RF signal, and the at least one transceiver is configured to down convert a combination of the first inbound amplified RF signal and the second inbound amplified RF signal and provide the inbound digital data signal to the baseband processing module; or
the at least one transceiver is configured to up convert the outbound digital data signal and provide a combination of the first outbound RF signal and a second outbound RF signal, and the second front-end block is configured to amplify the second outbound RF signal and provide a second outbound amplified RF signal to the antenna; and
the second inbound RF signal and the second outbound amplified RF signal are the RF signals transmitted bi-directionally between the digital front-end module and the antenna.

14. The apparatus of claim 13 wherein the first front-end block, the second front-end block, and the at least one transceiver are coupled to the MIPI bus, wherein the MIPI bus is configured to:
transmit transceiver control signals between the baseband processing module and the at least one transceiver;
transmit first front-end control signals between the baseband processing module and the first front-end block; and
transmit second front-end control signals between the baseband processing module and the second front-end block, wherein the transceiver control signals, the first front-end control signals, and the second front-end control signals are the digital control signals transmitted within the MIPI bus.

15. The apparatus of claim 14 wherein the digital front-end module further includes a first tunable bandpass filter between the first front-end block and the diplexer, and a second tunable bandpass filter between the second front-end block and the diplexer.

16. The apparatus of claim 15 wherein the first tunable bandpass filter and the second tunable bandpass filter do not have joint bandwidths simultaneously.

17. The apparatus of claim 1 wherein the digital front-end module further includes a second front-end block and a diplexer, and the least one transceiver includes a first transceiver and a second transceiver, wherein:
the first front-end block and the second front-end block are coupled to the antenna through the diplexer;
the first transceiver is coupled between the baseband processing module and the first front-end block, while the second transceiver is coupled between the baseband processing module and the second front-end block;
the first transceiver is configured to down convert the first inbound amplified RF signal and provide the inbound digital data signal to the baseband processing module, or the first transceiver is configured to up convert the outbound digital data signal and provide the first outbound RF signal;
the second front-end block is configured to amplify a second inbound RF signal from the antenna and provide a second inbound amplified RF signal, and the second transceiver is configured to down convert the second inbound amplified RF signal and provide a second inbound digital data signal to the baseband processing module; or
the second transceiver is configured to up convert a second outbound digital data signal and provide a second outbound RF signal, and the second front-end block is configured to amplify the second outbound RF signal and provide a second outbound amplified RF signal to the antenna; and
the second inbound digital data signal and the second outbound digital data signal are the digital data signals transmitted between the baseband processing module and the digital front-end module, and the second inbound RF signal and the second outbound amplified RF signal are the RF signals transmitted between the digital front-end module and the antenna.

18. The apparatus of claim 17 wherein the first front-end block, the second front-end block, the first transceiver, and the second transceiver are coupled to the MIPI bus, wherein the MIPI bus is configured to:
transmit first transceiver control signals between the baseband processing module and the first transceiver;
transmit second transceiver control signals between the baseband processing module and the second transceiver;
transmit first front-end control signals between the baseband processing module and the first front-end block; and
transmit second front-end control signals between the baseband processing module and the second front-end block, wherein the first transceiver control signals, the second transceiver control signals, the first front-end control signals, and the second front-end control signals are the digital control signals transmitted within the MIPI bus.

19. The apparatus of claim 18 wherein the digital front-end module further includes a first tunable bandpass filter between the first front-end block and the diplexer, and a second tunable bandpass filter between the second front-end block and the diplexer.

20. The apparatus of claim 19 wherein the first tunable bandpass filter and the second tunable bandpass filter do not have joint bandwidths simultaneously.

* * * * *